(12) United States Patent
Song et al.

(10) Patent No.: US 11,807,706 B2
(45) Date of Patent: Nov. 7, 2023

(54) THERMOPLASTIC POLYURETHANE (TPU) FOAM PRODUCT WITH HIGH FLATNESS, AND PREPARATION METHOD AND USE THEREOF

(71) Applicant: Miracll Chemicals Co., Ltd., Yantai (CN)

(72) Inventors: Hongwei Song, Yantai (CN); Guangfu Wang, Yantai (CN); Chongchong Yang, Yantai (CN); Sheng Zhang, Yantai (CN); Renhong Wang, Yantai (CN)

(73) Assignee: Miracll Chemicals Co., Ltd., Yantai (CN)

( * ) Notice: Subject to any disclaimer, the term of this patent is extended or adjusted under 35 U.S.C. 154(b) by 0 days.

(21) Appl. No.: 17/778,413

(22) PCT Filed: Jan. 8, 2021

(86) PCT No.: PCT/CN2021/070856
§ 371 (c)(1),
(2) Date: May 20, 2022

(87) PCT Pub. No.: WO2021/104536
PCT Pub. Date: Jun. 3, 2021

(65) Prior Publication Data
US 2023/0002539 A1 Jan. 5, 2023

(30) Foreign Application Priority Data
Nov. 26, 2019 (CN) .......................... 201911175366.1

(51) Int. Cl.
| | | |
|---|---|---|
| C08G 18/08 | (2006.01) | |
| C08G 18/12 | (2006.01) | |
| C08G 18/24 | (2006.01) | |
| C08G 18/32 | (2006.01) | |
| C08G 18/48 | (2006.01) | |
| C08G 18/66 | (2006.01) | |
| C08G 18/73 | (2006.01) | |
| C08J 9/12 | (2006.01) | |
| C08J 9/14 | (2006.01) | |
| C08J 9/18 | (2006.01) | |
| C08J 9/228 | (2006.01) | |
| C08G 101/00 | (2006.01) | |

(52) U.S. Cl.
CPC ............ *C08G 18/14* (2013.01); *C08G 18/12* (2013.01); *C08G 18/244* (2013.01); *C08G 18/3206* (2013.01); *C08G 18/4854* (2013.01); *C08G 18/6674* (2013.01); *C08G 18/73* (2013.01); *C08J 9/122* (2013.01); *C08J 9/141* (2013.01); *C08J 9/18* (2013.01); *C08J 9/228* (2013.01); *C08G 2101/00* (2013.01); *C08G 2110/0058* (2021.01); *C08G 2380/00* (2013.01); *C08G 2410/00* (2013.01); *C08J 2201/03* (2013.01); *C08J 2201/032* (2013.01); *C08J 2203/06* (2013.01); *C08J 2203/14* (2013.01); *C08J 2375/08* (2013.01)

(58) Field of Classification Search
CPC .... C08G 18/0895; C08G 18/12; C08G 18/14; C08G 18/18; C08G 18/244; C08G 18/246; C08G 18/3206; C08G 18/4238; C08G 18/4854; C08G 18/664; C08G 18/6674; C08G 18/73; C08G 18/755; C08G 18/758; C08G 2101/00; C08G 2110/0033; C08G 2110/0058; C08G 2110/0066; C08G 2380/00; C08G 2410/00; C08J 9/122; C08J 9/141; C08J 9/16; C08J 9/18; C08J 9/228; C08J 9/232; C08J 2201/03; C08J 2201/032; C08J 2203/06; C08J 2203/14; C08J 2375/04; C08J 2375/06; C08J 2375/08
See application file for complete search history.

(56) References Cited

U.S. PATENT DOCUMENTS

2010/0222442 A1* 9/2010 Prissok ................ C08J 9/232
521/56

FOREIGN PATENT DOCUMENTS

| CN | 101370861 A | 2/2009 | |
|---|---|---|---|
| CN | 102276785 A | 12/2011 | |
| CN | 102712776 A | 10/2012 | |
| CN | 103642200 A | 3/2014 | |
| CN | 103804889 A | 5/2014 | |
| CN | 108676329 A | 10/2018 | |
| CN | 108884260 A | 11/2018 | |
| CN | 109312100 A | 2/2019 | |
| CN | 109983062 A | 7/2019 | |
| CN | 110183843 A * | 8/2019 | ......... C08G 18/3206 |
| EP | 1031602 A1 | 8/2000 | |
| WO | 2007082838 A1 | 7/2007 | |
| WO | 2010136398 A1 | 12/2010 | |

* cited by examiner

*Primary Examiner* — John M Cooney
(74) *Attorney, Agent, or Firm* — Bayramoglu Law Offices LLC

(57) ABSTRACT

A thermoplastic polyurethane (TPU) foam product with high flatness, and a preparation method and a use thereof are provided. The TPU foam product is prepared by processing aliphatic thermoplastic polyurethane (ATPU) beads with a melting range of 20° C. to 50° C. and a melting point of 90° C. to 160° C. by a physical gas foaming process to obtain foamed ATPU beads and heating the foamed ATPU beads with a heat source to make the foamed ATPU beads fused. The TPU foam product with high flatness has a density of 0.08 g/cm³ to 0.8 g/cm³ and a flatness value of less than 2 mm, and the flatness value is determined by a fixed-length ruler. The TPU foam product not only has high flatness such that diversified designs are allowed for a surface of the product, but also has high resilience.

16 Claims, 1 Drawing Sheet

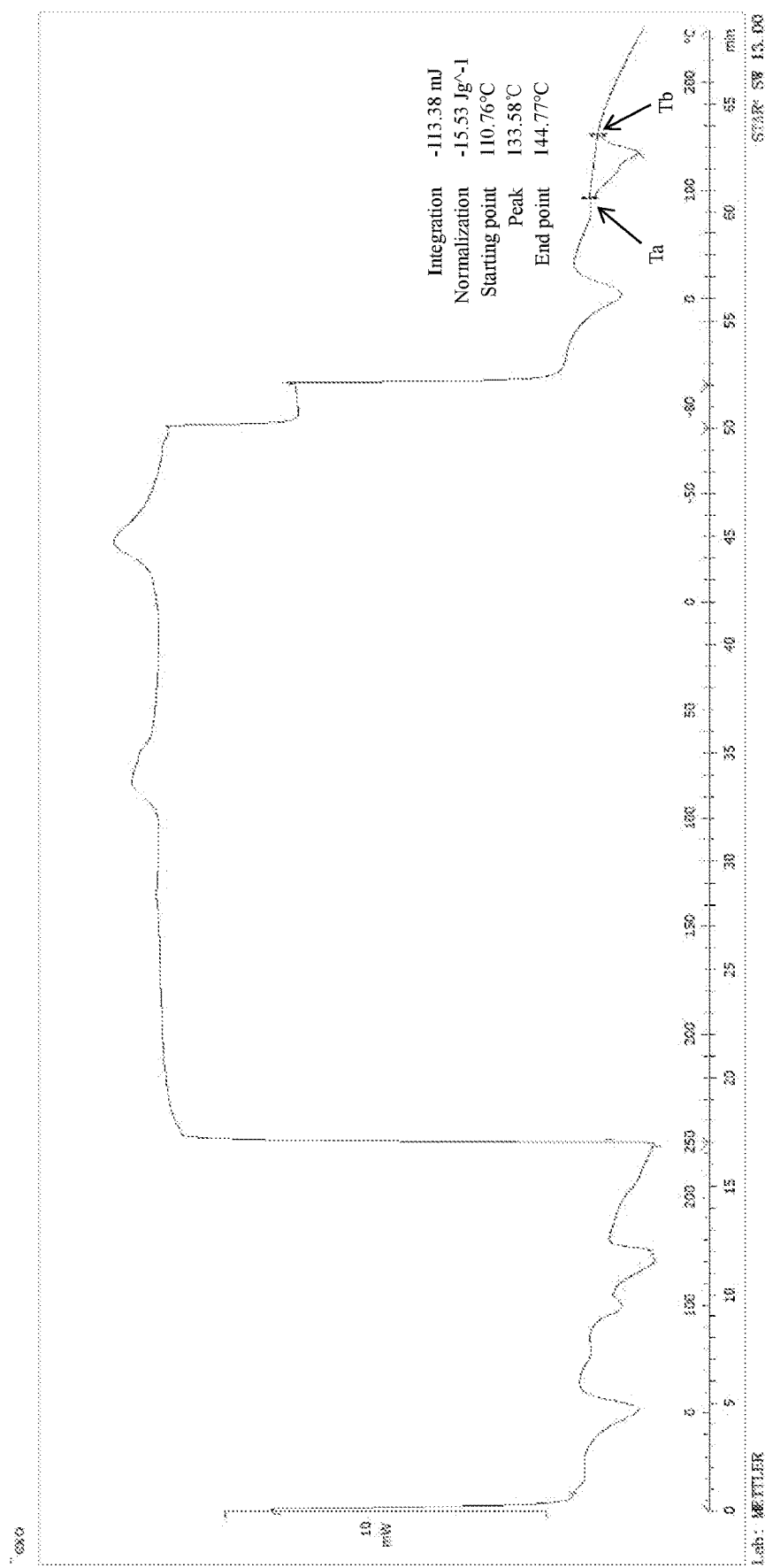

ical field

THERMOPLASTIC POLYURETHANE (TPU) FOAM PRODUCT WITH HIGH FLATNESS, AND PREPARATION METHOD AND USE THEREOF

CROSS REFERENCE TO THE RELATED APPLICATIONS

This application is the national phase entry of International Application No. PCT/CN2021/070856, filed on Jan. 8, 2021, which is based upon and claims priority to Chinese Patent Application No. 201911175366.1, filed on Nov. 26, 2019, the entire contents of which are incorporated herein by reference.

TECHNICAL FIELD

The present disclosure belongs to the field of foamed polymers, and in particular relates to a thermoplastic polyurethane (TPU) foam product with high flatness, and a preparation method and a use thereof.

BACKGROUND

TPU has advantages such as wide hardness range; excellent wear resistance, mechanical strength, water resistance, oil resistance, chemical resistance, and mold resistance; and environmental friendliness. In addition to maintaining the excellent properties of a TPU matrix material, foamed TPU materials have a series of advantages such as low density, heat and sound insulation, high specific strength, high elasticity, and buffering, and thus show promising application prospects in packaging, manufacturing, agriculture, transportation, military, aerospace, commodities, and other fields.

Expanded thermoplastic polyurethane (ETPU) beads and a preparation method thereof have been disclosed in many patent documents, such as patent documents WO2007/082838, WO2010/136398A, CN102276785A, and the like. In addition, the patent document WO2007/082838 also discloses a processing method of ETPU beads, where the ETPU beads are filled in a mold and then hot-molded with steam to obtain a molded foamed product. At present, ETPU molded products are widely used in fields such as shoe materials, sports goods, and children's toys.

However, the current ETPU molded products on the market are prepared by melting and bonding ETPU beads through a hot-molding process with steam, and thus these ETPU molded products have a rough and uneven surface. Therefore, it is impossible to conduct diversified appearance designs on the surface of these ETPU molded products, and the appearance of these products is relatively single, which limits the application prospects of these products.

SUMMARY

In order to solve the technical problem that the existing foamed TPU products have a rough and uneven surface in the above background art, the present disclosure provides a TPU foam product with high flatness, and a preparation method and a use thereof.

The present disclosure adopts the following technical solutions to solve the above-mentioned technical problem: A TPU foam product with high flatness is provided, including an aliphatic thermoplastic polyurethane (ATPU) that has a melting range of 20° C. to 50° C. and a melting point of 90° C. to 160° C., preferably 100° C. to 150° C., and more preferably 120° C. to 145° C. The TPU foam product with high flatness has a density of 0.08 g/cm³ to 0.8 g/cm³, preferably 0.1 g/cm³ to 0.5 g/cm³, and more preferably 0.1 g/cm³ to 0.3 g/cm³; and the TPU foam product with high flatness has a flatness value of less than 2 mm, preferably less than 1 mm, and more preferably less than 0.5 mm, and the flatness value is determined by a fixed-length ruler.

The melting range and melting point of the ATPU are determined by differential scanning calorimetry (DSC). Specifically, the melting range and melting point are obtained by the measurement of an instrument with a model of DSC 1 from METTLER and the data analysis of STARe software. More specifically, 5 mg to 10 mg of ATPU beads are heated from −90° C. to 250° C. at a heating rate of 20° C./min, kept at the temperature for 2 min, cooled from 250° C. to −90° C. at a cooling rate of 10° C./min, and finally heated from −90° C. to 250° C. at a heating rate of 20° C./min; and a difference between a starting point and an end point of a melting peak temperature of the obtained DSC during the second temperature rise process is taken as the melting range of the ATPU beads, and a melting peak temperature of the obtained DSC curve during the second temperature rise process is taken as the melting point of the ATPU beads.

If the melting point of the ATPU is lower than 90° C., the thermal stability of the prepared foam product will be heavily reduced; and if the melting point of the ATPU is higher than 160° C., a processing pressure required during a molding process of the product is high, which increases a steam cost, reduces a fusion rate among foamed ATPU beads, and reduces a strength of the product.

Beneficial effects of the present disclosure: The TPU foam product with high flatness disclosed in the present disclosure is prepared from ATPU with low melting point, such that ETPU beads obtained after foaming require a low molding pressure during steam molding, which reduces the steam consumption and the production cost. In addition, the TPU foam product with high flatness of the present disclosure not only has excellent resilience, but also has high flatness, and thus ETPU molded products with high flatness can have many appearance designs through mold pattern designs.

The following improvements can be further made by the present disclosure based on the above technical solution.

Further, the ATPU may be at least one selected from the group consisting of a hexamethylene diisocyanate (HDI) type, an isophorone diisocyanate (IPDI) type, a xylylene diisocyanate (XDI) type, a hydrogenated diphenylmethane diisocyanate (HMDI) type, and a hydrogenated XDI type; may preferably be an HDI type, an XDI type, or a hydrogenated XDI type; and may more preferably be an HDI type.

Further, the ATPU may have a shore hardness of 60 A to 60 D, preferably 70 A to 55 D, more preferably 75 A to 95 A, and most preferably 85 A to 95 A; and the shore hardness may be determined according to ASTM D2240-05.

Further, the ATPU may have a melt index of 10 to 250 g/10 min, preferably 15 to 100 g/10 min, and more preferably 20 to 50 g/10 min; and the melt index may be determined by applying a weight of 5 kg at 190° C. according to ASTM D1238.

The present disclosure also provides a preparation method of the TPU foam product with high flatness described above, including the following steps:

a. processing ATPU beads with a melting range of 20° C. to 50° C. and a melting point of 90° C. to 160° C. by a physical gas foaming process to obtain foamed ATPU beads; and b. filling the foamed ATPU beads obtained in step a into a mold, and heating with a heat source such that the foamed ATPU beads are fused to each other to obtain the TPU foam product with high flatness.

Beneficial effects of the present disclosure: Foamed ATPU beads are prepared from ATPU with a narrow melting range and a low melting point, such that the ETPU beads are easily fused during molding, with inapparent joint seams, which makes the foam product made from the foamed TPU beads have high flatness and thus enables diversified designs for the surface of the product. In addition, the obtained TPU foam product with high flatness has excellent resilience.

Further, in step a, the physical gas foaming process may be a physical gas extrusion foaming process or an autoclave impregnation process.

Further, the physical gas extrusion foaming process may include: feeding the ATPU beads into an extruder for melting, injecting 0.01 to 20 parts by weight of a physical foaming agent into the extruder based on an amount of the ATPU beads in parts by weight, controlling a temperature of a die head at 80° C. to 180° C., and finally extruding through the die head and underwater pelletizing to obtain the foamed ATPU beads; and the autoclave impregnation process may include: feeding the ATPU beads into a pressure-resistant container, injecting a physical foaming agent into the pressure-resistant container, heating the materials to 80° C. to 150° C., controlling a pressure in the pressure-resistant container at 50 bar to 150 bar, and finally releasing the pressure to a conventional pressure to obtain the foamed ATPU beads.

Further, the physical foaming agent may be at least one selected from the group consisting of nitrogen, carbon dioxide, methane, propane, butane, and pentane.

Further, the heating with a heat source may refer to one selected from the group consisting of steam heating, microwave heating, and electromagnetic heating.

The present disclosure also provides a use of the TPU foam product with high flatness described above in shoe soles, tires, bicycle seats, interior decorations, cushioning pads, sound insulating pads, and children's toys, where the TPU foam product with high flatness is used to prepare shoe soles, tires, bicycle seats, interior decorations, cushioning pads, sound insulating pads, and children's toys.

Beneficial effects of the present disclosure: The TPU foam product with high flatness can be used to prepare shoe soles, tires, bicycle seats, interior decorations, cushioning pads, sound insulating pads, and children's toys, which can improve the quality of these products.

The ATPU beads of the present disclosure may be prepared from an aliphatic isocyanate, a polyhydroxy compound, a chain extender, and an additive, where the polyhydroxy compound and the aliphatic isocyanate undergo a polymerization reaction; and the polyhydroxy compound, the aliphatic isocyanate, the chain extender, and the additive are in a weight ratio of 1:(0.2-0.8):(0.02-0.2):(0.005-0.05).

Further, the aliphatic isocyanate may be at least one compound selected from the group consisting of HDI, IPDI, hydrogenated XDI, and HMDI.

Beneficial effects of the above further solution: The aliphatic isocyanate selected above can make the TPU disclosed in the present disclosure have high quality.

Further, the polyhydroxy compound may be at least one compound selected from the group consisting of a polyester polyol, a polyether polyol, a polycaprolactone polyol, and a polycarbonate polyol.

Beneficial effects of the above further solution: The polyhydroxy compound selected above can make the TPU disclosed in the present disclosure have high quality.

Further, the chain extender may be at least one compound selected from the group consisting of 1,2-ethylene glycol, 1,3-propylene glycol, 1,4-butylene glycol, 1,6-hexylene glycol, cyclohexanedimethanol, and hydroquinone dihydroxyethyl ether.

Beneficial effects of the above further solution: The chain extender selected above can make the TPU disclosed in the present disclosure have high quality.

Further, the additive may be at least one selected from the group consisting of an antioxidant, a stabilizer, a flame retardant, an antisticking agent, a plasticizer, a lubricant, a pigment, an organic filler, and an inorganic filler.

Further, a trivalent phosphorus-containing organic compound is particularly preferred as the additive, and the trivalent phosphorus-containing organic compound includes phosphite. The phosphite may be at least one selected from the group consisting of triphenyl phosphite, tris(nonylphenyl)phosphite, tris(octadecyl)phosphite, trilauryl phosphite, tris(2,4-di-tert-butylphenyl)phosphite, triisodecyl phosphite, phenyldialkyl phosphite, diisodecyl pentaerythritol diphosphite, bis(2,4-di-tert-butylphenyl)pentaerythritol diphosphite, distearyl pentaerythritol diphosphite, isodecyl diphenyl phosphite, diisodecyl phenyl phosphite, and dipropylene glycol phenyl phosphite.

The additive may also preferably be an inorganic powder filler, and the inorganic powder filler may be a mixture of at least two selected from the group consisting of kaolin, talc, calcium carbonate, quartz, aluminum oxide, aluminum silicate, and silica.

The antioxidant may include at least one selected from the group consisting of 1010, 1076, 1098, 3114, 126, 168, and 618.

Further, a catalyst may be also involved, and a weight ratio of the catalyst to the aliphatic isocyanate may be (0.001-0.05):1.

Beneficial effects of the above further solution: The catalyst can greatly improve a preparation speed of the TPU, which is beneficial to the production efficiency of the product.

Further, the catalyst may be at least one compound selected from the group consisting of triethylamine (TEA), dimethylcyclohexylamine, N-methylmorpholine, 2-(dimethylaminoethoxy)ethanol, titanate, stannous diacetate, stannous dilaurate, dibutyltin diacetate, and dibutyltin dilaurate.

Beneficial effects of the above further solution: The catalyst selected above can make the TPU disclosed in the present disclosure have high quality and increase a synthesis speed.

Further, a preparation method of the ATPU may include the following steps:
A. mixing the aliphatic isocyanate, the polyhydroxy compound, the chain extender, and the additive thoroughly to obtain a mixture; and
B. feeding the mixture obtained in step A into a twin-screw extruder, and conducting a continuous reaction to obtain the TPU, where the obtained TPU has a melt index MFR of 5 to 250 g/10 min and a melting point of 100° C. to 160° C.

Further, in step B, the continuous reaction may be conducted at 80° C. to 260° C.

Beneficial effects of the above further solution: An appropriate reaction temperature is beneficial to the progress of the preparation process, thereby improving the production efficiency.

Further, in step A, a catalyst may be added.

Beneficial effects of the above further solution: The catalyst can effectively speed up the reaction and improve the reaction efficiency.

BRIEF DESCRIPTION OF THE DRAWINGS

FIGURE shows a DSC test curve of TPU beads prepared in Example 1 of the present disclosure, where a melting range=Tb−Ta and a melting point is Tm.

DETAILED DESCRIPTION OF THE EMBODIMENTS

The principles and features of the present disclosure are described below with reference to the accompanying drawings. The listed embodiments are only used to explain the present disclosure, rather than to limit the scope of the present disclosure.

Example 1

A preparation method of a TPU for an expanded bead product with high flatness was provided in this example, including the following steps:
 a. 1 part by weight of polytetramethylene ether with an average mole number of 1,000 g/mol, 0.38 part by weight of HMDI, 0.043 part by weight of 1,4-butylene glycol, 0.005 part by weight of stannous dilaurate, and 0.01 part by weight of an antioxidant 1010 were delivered to a pouring system through a gear pump and thoroughly mixed to obtain a mixture; and
 b. the mixture obtained in step a was poured into a twin-screw extruder to undergo a continuous reaction to obtain the TPU. A temperature of each zone of the extruder was as follows: first and second zones: 150° C.; third, fourth, and fifth zones: 170° C.; sixth, seventh, and eighth zones: 180° C.; and ninth and tenth zones: 200° C. A temperature of a die head was 205° C. A rotational speed of a screw was 200 rpm.

The obtained TPU was cooled and pelletized to obtain TPU beads, and the TPU beads were subjected to a performance test. Test results are shown in Table 1. A DSC test curve was shown in the FIGURE, where a melting range=Tb−Ta=144.77−110.76=34° C. and a melting point Tm was 133° C. DSC spectra of TPU beads prepared in the following examples are similar to that in this example, which are not described in detail here.

Preparation of foamed TPU beads: 10 Kg of the TPU beads, 4 Kg of carbon dioxide, and 20 kg of water were added to a 500 L autoclave to prepare a suspension, then a temperature was raised to 90° C. and a pressure was maintained at 90 bar, then the suspension in the autoclave was discharged into the atmospheric environment, and resulting foamed TPU beads were dried and then subjected to a performance test. Test data are shown in Table 1.

Preparation of a TPU foam product: The foamed TPU beads obtained above were filled into a mold with a length of 300 mm, a width of 250 mm, and a thickness of 50 mm; the beads were compressed by 10% along a thickness direction of the mold with a steam at a pressure of 0.5 bar to make the beads bonded for molding to finally obtain a molded foam product; and then the molded foam product was dried in a 70° C. oven for 6 hours, then placed at room temperature for 2 hours, and subjected to a performance test. Test data are shown in Table 1.

Example 2

A preparation method of a TPU for an expanded bead product with high flatness was provided in this example, including the following steps:
 a. 1 part by weight of polybutylene adipate with an average mole number of 3,000 g/mol, 0.24 part by weight of IPDI, 0.09 part by weight of 1,6-hexylene glycol, 0.004 part by weight of dibutyltin diacetate, and 0.005 part by weight of a talc powder were delivered to a pouring system through a gear pump and thoroughly mixed to obtain a mixture; and
 b. the mixture obtained in step a was poured into a twin-screw extruder to undergo a continuous reaction to obtain the TPU. A temperature of each zone of the extruder was as follows: first and second zones: 150° C.; third, fourth, and fifth zones: 160° C.; sixth, seventh, and eighth zones: 170° C.; and ninth and tenth zones: 180° C. A temperature of a die head was 185° C. A rotational speed of a screw was 300 rpm.

The obtained TPU was cooled and pelletized to obtain TPU beads, and the TPU beads were subjected to a performance test. Test results are shown in Table 1.

Preparation of foamed TPU beads: 10 Kg of the TPU beads, 4 Kg of carbon dioxide, and 20 kg of water were added to a 500 L autoclave to prepare a suspension, then a temperature was raised to 102° C. and a pressure was maintained at 75 bar, then the suspension in the autoclave was discharged into the atmospheric environment, and resulting foamed TPU beads were dried and then subjected to a performance test. Test data are shown in Table 1.

Preparation of a TPU foam product: The foamed TPU beads obtained above were filled into a mold with a length of 300 mm, a width of 250 mm, and a thickness of 50 mm; the beads were compressed by 10% along a thickness direction of the mold with a steam at a pressure of 0.8 bar to make the beads bonded for molding to finally obtain a molded foam product; and then the molded foam product was dried in a 70° C. oven for 6 hours, then placed at room temperature for 2 hours, and subjected to a performance test. Test data are shown in Table 1.

Example 3

A preparation method of a TPU for an expanded bead product with high flatness was provided in this example, including the following steps:
 a. 1 part by weight of polytetramethylene ether with an average mole number of 1,500 g/mol, 0.34 part by weight of HDI, 0.12 part by weight of 1,4-butylene glycol, 0.002 part by weight of TEA, and 0.01 part by weight of an antioxidant 1098 were delivered to a pouring system through a gear pump and thoroughly mixed to obtain a mixture; and
 b. the mixture obtained in step a was poured into a twin-screw extruder to undergo a continuous reaction to obtain the TPU. A temperature of each zone of the extruder was as follows: first and second zones: 150° C.; third, fourth, and fifth zones: 180° C.; sixth, seventh, and eighth zones: 185° C.; and ninth and tenth zones: 200° C. A temperature of a die head was 205° C. A rotational speed of a screw was 250 rpm.

The obtained TPU was cooled and pelletized to obtain TPU beads, and the TPU beads were subjected to a performance test. Test results are shown in Table 1.

Preparation of foamed TPU beads: 10 Kg of the TPU beads, 4 Kg of carbon dioxide, and 20 kg of water were added to a 500 L autoclave to prepare a suspension, then a temperature was raised to 110° C. and a pressure was maintained at 110 bar, then the suspension in the autoclave was discharged into the atmospheric environment, and resulting foamed TPU beads were dried and then subjected to a performance test. Test data are shown in Table 1.

Preparation of a TPU foam product: The foamed TPU beads obtained above were filled into a mold with a length of 300 mm, a width of 250 mm, and a thickness of 50 mm; the beads were compressed by 10% along a thickness direction of the mold with a steam at a pressure of 1.2 bar to make the beads bonded for molding to finally obtain a molded foam product; and then the molded foam product was dried in a 70° C. oven for 6 hours, then placed at room temperature for 2 hours, and subjected to a performance test. Test data are shown in Table 1.

Comparative Example 1

A method in this comparative example was the same as in Example 1, except that the 0.38 part by weight of HMDI was replaced by 0.55 part by weight of an aromatic isocyanate diphenylmethane diisocyanate (MDI), and the 0.043 part by weight of 1,4-butylene glycol was replaced by 0.11 part by weight of 1,4-butylene glycol. Test results are shown in Table 1.

Comparative Example 2

A method in this comparative example was the same as in Example 2, except that the 0.24 part by weight of IPDI was replaced by 0.41 part by weight of an aromatic isocyanate MDI, and the 0.09 part by weight of 1,6-hexylene glycol was replaced by 0.15 part by weight of 1,6-hexylene glycol. Test results are shown in Table 1.

Comparative Example 3

A method in this comparative example was the same as in Example 3, except that the 0.34 part by weight of HDI was replaced by 0.64 part by weight of MDI, and the 0.12 part by weight of 1,4-butylene glycol was replaced by 0.17 part by weight of 1,4-butylene glycol. Test results are shown in Table 1.

Comparative Example 4

A method in this comparative example was the same as in Example 3, except that the 0.34 part by weight of HDI was replaced by 0.44 part by weight of HDI, and the 0.12 part by weight of 1,4-butylene glycol was replaced by 0.17 part by weight of 1,4-butylene glycol. Test results are shown in Table 1.

TABLE 1

| | Item | Test standard and method | Example 1 | Example 2 | Example 3 | Comparative Example 1 | Comparative Example 2 | Comparative Example 3 | Comparative Example 4 |
|---|---|---|---|---|---|---|---|---|---|
| Components of TPU | Isocyanate | — | HMDI | IPDI | HDI | MDI | MDI | MDI | HDI |
| | Polyol | — | Polytetramethylene ether with an average mole number of 1,000 g/mol | Polybutylene adipate with an average mole number of 3,000 g/mol | Polytetramethylene ether with an average mole number of 1,500 g/mol | Polytetramethylene ether with an average mole number of 1,000 g/mol | Polybutylene adipate with an average mole number of 3,000 g/mol | Polytetramethylene ether with an average mole number of 1,500 g/mol | Polytetramethylene ether with an average mole number of 1,500 g/mol |
| | Chain extender | — | 1,4-Butylene glycol | 1,6-Hexylene glycol | 1,4-Butylene glycol | 1,4-Butylene glycol | 1,6-Hexylene glycol | 1,4-Butylene glycol | 1,4-Butylene glycol |
| | Catalyst | — | Stannous dilaurate | Dibutyltin diacetate | TEA | Stannous dilaurate | Dibutyltin diacetate | TEA | TEA |
| | Additive | — | Antioxidant 1010 | Talc powder | Antioxidant 1098 | Antioxidant 1010 | Talc powder | Antioxidant 1098 | Antioxidant 1098 |
| Composition of TPU (parts by weight) | Isocyanate | — | 0.38 | 0.24 | 0.34 | 0.56 | 0.4 | 0.64 | 0.44 |
| | Polyol | — | 1 | 1 | 1 | 1 | 1 | 1 | 1 |
| | Chain extender | — | 0.043 | 0.09 | 0.12 | 0.11 | 0.15 | 0.17 | 0.17 |
| | Catalyst | — | 0.005 | 0.004 | 0.002 | 0.005 | 0.004 | 0.002 | 0.002 |
| | Additive | — | 0.01 | 0.005 | 0.02 | 0.01 | 0.005 | 0.02 | 0.02 |
| TPU performance | Hardness (Shore A) | ASTM D2240 | 86 | 80 | 92 | 86 | 80 | 92 | 96 |
| | Tensile strength (Mpa) | ASTM D412 | 25 | 28 | 28 | 30 | 36 | 35 | 32 |
| | Elongation at break (%) | ASTM D412 | 550 | 480 | 450 | 580 | 600 | 500 | 400 |
| | Tearing strength (kN/m) | ASTM D624 | 60 | 75 | 80 | 70 | 80 | 100 | 85 |
| | Melt index MFR (g/10 min) | ASTM D1238, 190° C., a weight of 5 kg is applied | 80 | 150 | 20 | 60 | 180 | 20 | 25 |

TABLE 1-continued

Test results

| | Item | Test standard and method | Example 1 | Example 2 | Example 3 | Comparative Example 1 | Comparative Example 2 | Comparative Example 3 | Comparative Example 4 |
|---|---|---|---|---|---|---|---|---|---|
| | Melting range (° C.) | — | 34 | 20 | 50 | 50 | 60 | 65 | 58 |
| | Melting point (° C.) | — | 133 | 90 | 150 | 158 | 165 | 180 | 163 |
| Foaming parameter | Foaming agent | — | Carbon dioxide | Carbon dioxide | Carbon dioxide | Carbon dioxide | Carbon dioxide | Carbon dioxide | Carbon dioxide |
| | Foaming temperature (° C.) | — | 90 | 102 | 110 | 125 | 122 | 130 | 118 |
| | Foaming pressure (MPa) | — | 90 | 75 | 110 | 90 | 75 | 110 | 110 |
| Performance of expanded beads and a foam product formed from the expanded beads | Expanded bead density (g/cm$^3$) | ASTM D792 | 0.16 | 0.2 | 0.12 | 0.16 | 0.2 | 0.12 | 0.13 |
| | Molding pressure (bar) | — | 0.5 | 0.8 | 1.2 | 2.6 | 2.4 | 3.2 | 1.9 |
| | Foam product density (g/cm$^3$) | ASTM D792 | 0.19 | 0.24 | 0.16 | 0.19 | 0.24 | 0.16 | 0.16 |
| | Tensile strength (Mpa) | ISO179:2008 | 1.6 | 1.4 | 1.6 | 1.0 | 1.3 | 1.2 | 0.8 |
| | Elongation at break (%) | ISO179:2008 | 140 | 145 | 135 | 160 | 180 | 140 | 80 |
| | Tearing strength (kN/m) | ASTM D624 | 14 | 10 | 12 | 14 | 16 | 10 | 7 |
| | Ball drop resilience (%) | ISO830:007 | 72 | 68 | 75 | 56 | 56 | 58 | 75 |
| | Foam product flatness | — | 0.5 | 0.3 | 0.2 | 3.2 | 4.5 | 2.8 | 3.2 |

Notes:
(1) The melting range and melting point of the ATPU are determined by differential scanning calorimetry (DSC). Specifically, the melting range and melting point are obtained by the measurement of an instrument with a model of DSC 1 from METTLER and the data analysis of STARe software. More specifically, 5 mg to 10 mg of ATPU beads are heated from −90° C. to 250° C. at a heating rate of 20° C./min, kept at the temperature for 2 min, cooled from 250° C. to −90° C. at a cooling rate of 10° C./min, and finally heated from −90° C. to 250° C. at a heating rate of 20° C./min; and a difference between a starting point and an end point of a melting peak temperature of the obtained DSC during the second temperature rise process is taken as the melting range of the ATPU beads, and a melting peak temperature of the obtained DSC curve during the second temperature rise process is taken as the melting point of the ATPU beads.
(2) Flatness evaluation of the foam products: A non-textured flat mold is used to mold the foamed beads into a product, and a flatness of a surface of the product is measured by a fixed-length ruler. The smoothness is represented by a maximum gap between a reference plane of the ruler and the surface of the product, expressed in mm. Each product is tested for 10 times, and then an average is taken. The flatness is tested for 10 products in each experiment, and then an average is taken.

From the data in Table 1, compared with Comparative Examples 1, 2, 3, and 4, in Examples 1, 2, and 3 adopting the technical solution of the present disclosure, the obtained foamed TPU beads require a lower steam pressure for molding, which reduces the cost. In addition, the foamed TPU bead product prepared by the technical solution of the present disclosure not only retains various excellent properties, but also has the optimal surface flatness, which solves the problem that the current foamed TPU bead products have an uneven surface, and greatly improves the quality of the product.

In the description of this specification, the description with reference to the terms such as "one embodiment", "some embodiments", and "a specific embodiment" means that the specific features, structures, materials, or characteristics described with reference to the embodiment or example are included in at least one embodiment or example of the present disclosure. In this specification, the schematic descriptions of the above terms do not necessarily refer to the same embodiment or example. Moreover, the specific features, structures, materials, or characteristics described may be combined in any suitable manner in any one or more embodiments or examples.

The above descriptions are merely preferred examples of the present disclosure, and are not intended to limit the present disclosure. Any modifications, equivalent replacements, improvements, and the like made within the spirit and principle of the present disclosure shall be all included in the protection scope of the present disclosure.

What is claimed is:

1. A preparation method of the TPU foam product with the high flatness comprising an aliphatic thermoplastic polyurethane (ATPU) with a melting range of 20° C. to 50° C. and a melting point of 90° C. to 160° C., wherein the TPU foam product with the high flatness has a density of 0.08 g/cm$^3$ to 0.8 g/cm$^3$ and a flatness value of less than 2 mm comprising the following steps:

a) processing ATPU beads with a melting range of 20° C. to 50° C. and a melting point of 90° C. to 160° C. by a physical gas foaming process to obtain foamed ATPU beads; and b) filling the foamed ATPU beads obtained in step a) into a mold, and heating the foamed ATPU beads with a heat source so the foamed ATPU beads fuse to each other to obtain the TPU foam product with the high flatness;

wherein the ATPU beads are prepared from an aliphatic isocyanate, a polyhydroxy compound, a chain extender, and an additive;

the polyhydroxy compound and the aliphatic isocyanate undergo a polymerization reaction;

the polyhydroxy compound, the aliphatic isocyanate, the chain extender, and the additive are in a weight ratio of 1:(0.2-0.8):(0.02-0.2):(0.005-0.05); and the additive is at least one selected from the group consisting of flame retardant, an antisticking agent, a plasticizer, a lubricant, a pigment, an organic filler, and an inorganic filler.

2. The preparation method of the TPU foam product with the high flatness according to claim 1, wherein in step a), the physical gas foaming process is a physical gas extrusion foaming process or an autoclave impregnation process.

3. The preparation method of the TPU foam product with the high flatness according to claim 2, wherein the physical gas extrusion foaming process comprises: feeding the ATPU beads into an extruder for melting, injecting 0.01 to 20 parts by weight of a physical foaming agent based on a weight of the ATPU beads at an end of the extruder, controlling a temperature of a die head at 80° C. to 180° C., and finally extruding through the die head and underwater pelletizing to obtain the foamed ATPU beads.

4. The preparation method of the TPU foam product with the high flatness according to claim 3, wherein the physical foaming agent is at least one selected from the group consisting of nitrogen, carbon dioxide, methane, propane, butane, and pentane.

5. The preparation method of the TPU foam product with the high flatness according to claim 1, wherein the heating with the heat source is selected from the group consisting of steam heating, microwave heating, and electromagnetic heating.

6. The preparation method of the TPU foam product with the high flatness according to claim 1, wherein the ATPU is at least one selected from the group consisting of a hexamethylene diisocyanate (HDI) type, an isophorone diisocyanate (IPDI) type, a xylylene diisocyanate (XDI) type, a hydrogenated diphenylmethane diisocyanate (HMDI) type, and a hydrogenated XDI type.

7. The preparation method of the TPU foam product with the high flatness according to claim 5, wherein the ATPU has a shore hardness of 60 A to 60 D.

8. The preparation method of the TPU foam product with the high flatness according to claim 1, wherein the ATPU has a melt index of 10 to 250 g/10 min, determined by applying a weight of 5 kg at 190° C.

9. The preparation method of the TPU foam product with the high flatness according to claim 1, wherein the polyhydroxy compound is at least one compound selected from the group consisting of a polyester polyol, a polyether polyol, a polycaprolactone polyol, and a polycarbonate polyol and the chain extender is at least one compound selected from the group consisting of 1,2-ethylene glycol, 1,3-propylene glycol, 1,4-butylene glycol, 1,6-hexylene glycol, cyclohexanedimethanol, and hydroquinone dihydroxyethyl ether.

10. The preparation method of the TPU foam product with the high flatness according to claim 1, wherein the additive is a trivalent phosphorus-containing organic compound selected from the group consisting of triphenyl phosphite, tris(nonylphenyl)phosphite, tris(octadecyl)phosphite, trilauryl phosphite, tris(2,4-di-tert-butylphenyl)phosphite, triisodecyl phosphite, phenyldialkyl phosphite, diisodecyl pentaerythritol diphosphite, bis(2,4-di-tert-butylphenyl) pentaerythritol diphosphite, distearyl pentaerythritol diphosphite, isodecyl diphenyl phosphite, diisodecyl phenyl phosphite, and dipropylene glycol phenyl phosphite.

11. The preparation method of the TPU foam product with the high flatness according to claim 9, where the additive is the inorganic filler comprising a mixture of at least two selected from the group consisting of kaolin, talc, calcium carbonate, quartz, aluminum oxide, aluminum silicate, and silica.

12. The preparation method of the TPU foam product with the high flatness according to claim 1, wherein preparing the ATPU beads further comprise the steps of:

mixing an aliphatic isocyanate, a polyhydroxy compound, a chain extender, and an additive thoroughly to obtain a mixture; and feeding the mixture obtained into a twin-screw extruder, and conducting a continuous reaction to obtain the TPU foam product with high flatness, wherein the continuous reaction is conducted at 80° C. to 260° C.

13. The preparation method of the TPU foam product with the high flatness according to claim 12, wherein a catalyst is mixed with the aliphatic isocyanate, the polyhydroxy compound, the chain extender, and the additive.

14. The preparation method of the TPU foam product with the high flatness according to claim 12 wherein the TPU foam product with high flatness has a melt index MFR of 5 to 250 g/10 min and a melting point of 100° C. to 160° C.

15. The preparation method of the TPU foam product with the high flatness according to claim 2, wherein the autoclave impregnation process comprises: feeding the ATPU beads into a pressure-resistant container, injecting a physical foaming agent into the pressure-resistant container, heating a resulting material to 80° C. to 150° C., controlling a pressure in the pressure-resistant container at 50 bar to 150 bar, and finally releasing the pressure to a conventional pressure to obtain the foamed ATPU beads.

16. The preparation method of the TPU foam product with the high flatness according to claim 15, wherein the physical foaming agent is at least one selected from the group consisting of nitrogen, carbon dioxide, methane, propane, butane, and pentane.

* * * * *